(12) United States Patent
Johnson (10) Patent No.: US 10,569,114 B2
(45) Date of Patent: Feb. 25, 2020

(54) FIREFIGHTERS FITNESS TRAINER

(71) Applicant: Randal Wade Johnson, Canyon, TX (US)

(72) Inventor: Randal Wade Johnson, Canyon, TX (US)

(*) Notice: Subject to any disclaimer, the term of this patent is extended or adjusted under 35 U.S.C. 154(b) by 202 days.

(21) Appl. No.: 15/787,701

(22) Filed: Oct. 18, 2017

(65) Prior Publication Data

US 2018/0104521 A1    Apr. 19, 2018

Related U.S. Application Data

(60) Provisional application No. 62/409,682, filed on Oct. 18, 2016.

(51) Int. Cl.
| | |
|---|---|
| *G09B 19/00* | (2006.01) |
| *A62C 99/00* | (2010.01) |
| *A63B 21/075* | (2006.01) |
| *G09B 9/00* | (2006.01) |

(52) U.S. Cl.
CPC ........ *A62C 99/0081* (2013.01); *A63B 21/075* (2013.01); *G09B 9/00* (2013.01)

(58) Field of Classification Search
USPC ......... 434/219, 226, 247, 251, 258; 473/445
See application file for complete search history.

(56) References Cited

U.S. PATENT DOCUMENTS

| | | | | |
|---|---|---|---|---|
| 3,957,266 A | * | 5/1976 | Rice ..................... | A63B 21/015 482/91 |
| 4,001,949 A | * | 1/1977 | Francis .............. | A62C 99/0081 434/226 |
| 4,303,396 A | * | 12/1981 | Swiatosz ............ | A62C 99/0081 434/226 |
| 5,173,052 A | * | 12/1992 | Duncan, Jr. ........ | A62C 99/0081 296/168 |
| 5,927,990 A | * | 7/1999 | Welch ................ | A62C 99/0081 434/219 |
| 6,217,073 B1 | * | 4/2001 | Hoffman ............. | A63C 11/221 135/66 |
| 6,799,975 B1 | * | 10/2004 | Dunn .................... | G09B 19/00 434/219 |
| 7,416,412 B2 | * | 8/2008 | Segrest ................. | G09B 19/00 434/226 |
| 7,967,326 B2 | * | 6/2011 | Klementowicz, III .................... G09B 19/00 280/656 |
| 8,177,692 B2 | * | 5/2012 | Deppen .............. | A63B 21/0728 434/226 |

(Continued)

*Primary Examiner* — Kurt Fernstrom (74) *Attorney, Agent, or Firm* — Law Office of Jeff Williams PLLC; J. Oliver Williams (57) ABSTRACT

A device and method for the performing of fireground training exercises is presented. The device includes a sled having a plurality of runners. Further included is a frame in communication with the sled. The frame is coupled to the sled and defines a structure. A number of simulation exercises are facilitated via the device, such as a ceiling breach simulation device. The ceiling breach simulation device is configured to include a pole having a first end and a second end. The first end pivots about a mount in communication with the sled so as to maintain the point of rotation below the hands of the trainee. In one embodiment the ceiling breach simulation device permits both rotational motion as well as vertical translation of the pole.

17 Claims, 6 Drawing Sheets

(56) References Cited

U.S. PATENT DOCUMENTS

| | | | | |
|---|---|---|---|---|
| 8,360,782 | B1* | 1/2013 | Temple | G09B 19/00 |
| | | | | 434/226 |
| 8,622,744 | B2* | 1/2014 | Lumry | G09B 25/02 |
| | | | | 434/226 |
| 9,808,663 | B2* | 11/2017 | Chen | A63B 21/0626 |
| 2005/0233289 | A1* | 10/2005 | Hoglund | G09B 19/00 |
| | | | | 434/226 |
| 2006/0240392 | A1* | 10/2006 | Clifton | A62C 99/0081 |
| | | | | 434/226 |
| 2011/0143324 | A1* | 6/2011 | Paganini | A62C 99/0081 |
| | | | | 434/226 |
| 2018/0311521 | A1* | 11/2018 | Geisel | B65H 49/205 |
| 2019/0134440 | A1* | 5/2019 | Carter | F04B 17/06 |

* cited by examiner

FIREFIGHTERS FITNESS TRAINER

CLAIM OF PRIORITY

This application claims the benefit of U.S. Provisional Application No. 62/409,682, filed 18 Oct. 2016. The information contained therein is hereby incorporated by reference.

BACKGROUND

1. Field of the Invention

The present application relates to a training device, and more particularly to a device used in the act of training firefighters in fireground activities.

2. Description of Related Art

Tasks associated with being a firefighter are grueling and exhaustive. It is important for a firefighter to stay in shape in order to perform their various job functions in an emergency. When not adequately trained or fit, the consequences can be costly to both life and property. There are not many devices that are generated to simulate the various fireground activities of a fireman. Fireground activities refer to the duties of a firefighter on the ground, for example pulling hose, breaking down doors, breaching ceilings, and the removing of victims from a hazardous environment, and so forth.

Overall, it is important for firefighters to develop reflexes and muscles to perform the functions that they are commonly called upon to perform during fire and rescue operations. It is common that firefighters use a plethora of machines and weights to train in an effort to simulate real conditions. Some sleds have been created to try and simulate various functions of a firefighter in an emergency. Typically these are basic, having limited tools and functions. Additionally, these are not adaptable to the different size and build of firefighters. Furthermore, some try to simulate a ceiling breach with the pivot point of the pike pole at the top of the pole. This fails to adequately simulate the control of the pole in real use. It also makes operation of the pole difficult as the user is pushing against the pivot point. Other disadvantages are realized with conventional training methods.

Although strides have been made to increase the fitness of firefighters, considerable shortcomings remain. An all-in-one training device is needed that better simulates actual operation of the various functions and tools. Additionally it is desired that such a device be easily adjustable to compensate for the different heights and body builds of the firefighters.

SUMMARY OF THE INVENTION

It is an object of the present application to provide a firefighter training device that includes a sled having a plurality of runners; a frame in communication with the sled; and a ceiling breach simulation device in communication with the sled. The ceiling breach simulation device is configured to include a pole having a first end and a second end. The first end pivots about a mount in communication with the sled so as to maintain the point of rotation below the hands of the trainee.

It is an object of the present application to provide a training device to simulate a plurality of real life duties of the firefighter by providing a number of simulation devices. The ceiling breach simulation device is optionally configured to translate along a track so as to change the location of the mount relative to the sled. Furthermore a trainee is able to adjust the resistant to motion of the pole to accommodate the strength of the trainee.

It is an object of the present application to provide a stair simulation device in communication with the sled. The stair simulation device is configured to extend away from the frame beyond the sled.

It is an object of the present application to provide a rack in communication with an upper portion of the frame. The rack is configured to extend externally to the frame to support a ladder.

It is an object of the present application to provide a weight support member in communication with the sled. The weight support member is configured to secure an amount of weight within an interior of the frame. The weights are interchangeable to all affect the ease of movement of the sled along the ground.

It is an object of the present application to provide a door breach simulation device in communication with the frame. The door breach simulation device is configured to include a support coupled to an exterior of the frame and locate a pad.

It is an object of the present application to provide a hose mount in communication with an upper portion of the frame. The hose mount is configured to secure a portion of firehose to the frame. The frame including a tray in communication with the upper portion of the frame. The tray extending between opposing ends of the frame and is configured to support the firehose in a resting condition.

It is an object of the present application to provide a series of hose rungs in communication with the frame below the hose mount. The hose rungs redirect the forces on a user when pulling the firehose. The firehose wraps partially around one of the hose rungs.

It is an object of the present application to provide a hook member in communication with an upper portion of the frame. The hook member is configured to elevate a fitness weight above the sled. The fitness weight is removable to and designed to be carried by the trainee to simulate heavy tools.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the device and method of the present application is susceptible to various modifications and alternative forms, specific embodiments thereof have been shown by way of example in the drawings and are herein described in detail.

It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional fitness training devices and methods. In particular, the firefighter fitness training device of the present application is configured to provide a single unit training device that is capable of simulating multiple real life duties of a firefighter. The device is configured to simulate at least the following: a door breach, a ceiling breach, a hose pull, pulling a victim, climbing stairs, and carrying heavy tools, to name a few. The device is configured to adapt to the size of the trainee by permitting various operational supports. Additionally, various methods of adding weight and adjusting resistance is also provided. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes a sled having a plurality of runners for sliding across the ground or other surface. The device also includes a frame coupled to an upper surface of the sled. The frame is configured to support one or more simulation devices and components to perform a plurality of exercises. Also included is a ceiling breach device configured to simulate the operation of a pike pole by permitting a trainee to elevate one end of a pole. The pole being configured to pivot at a location adjacent the sled. Additional features and functions of the device are illustrated and discussed below.

Referring now to the drawings wherein like reference characters identify corresponding or similar elements in form and function throughout the several views. FIGS. 1-4 illustrate assorted views of firefighter training device 101. Device 101 is configured to simulate various acts required by firefighters to perform when called into duty. To do this, device 101 includes a plurality of simulation devices. Device 101 is configured to permit adjustability to the physical size and strength of the trainee.

Figure 1:
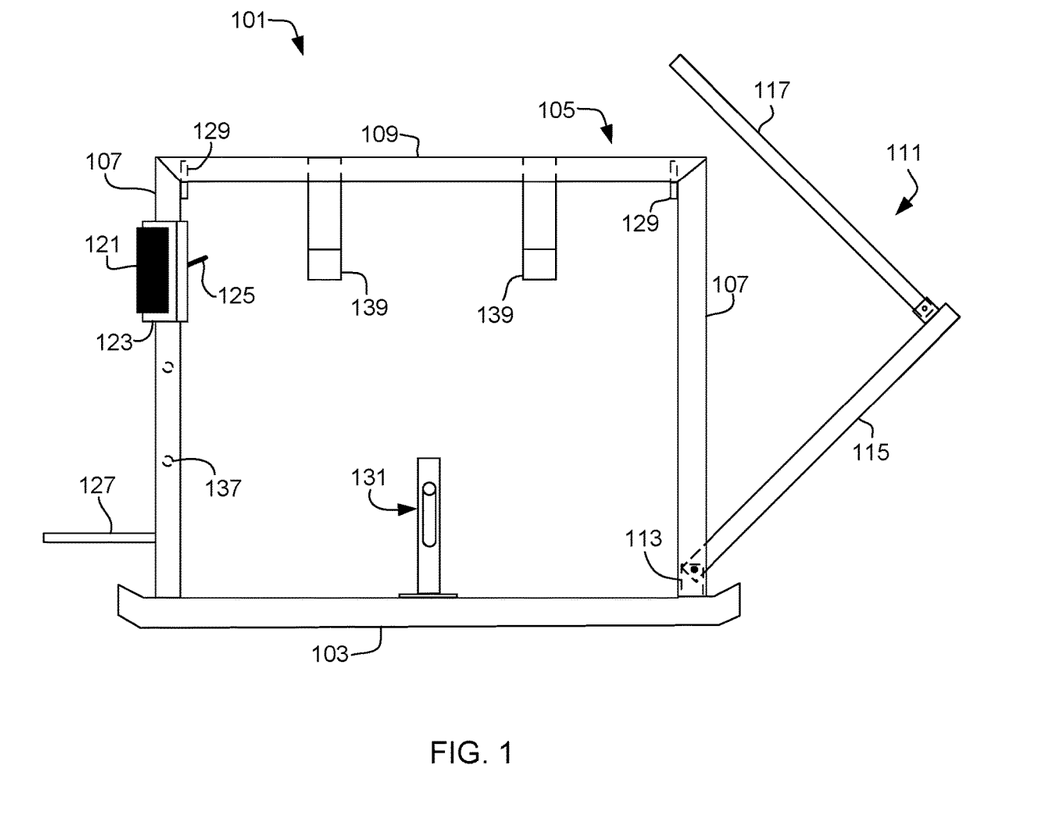
FIG. 1 is a left side view of a firefighter training device according to an embodiment of the present application.
Figure 2:
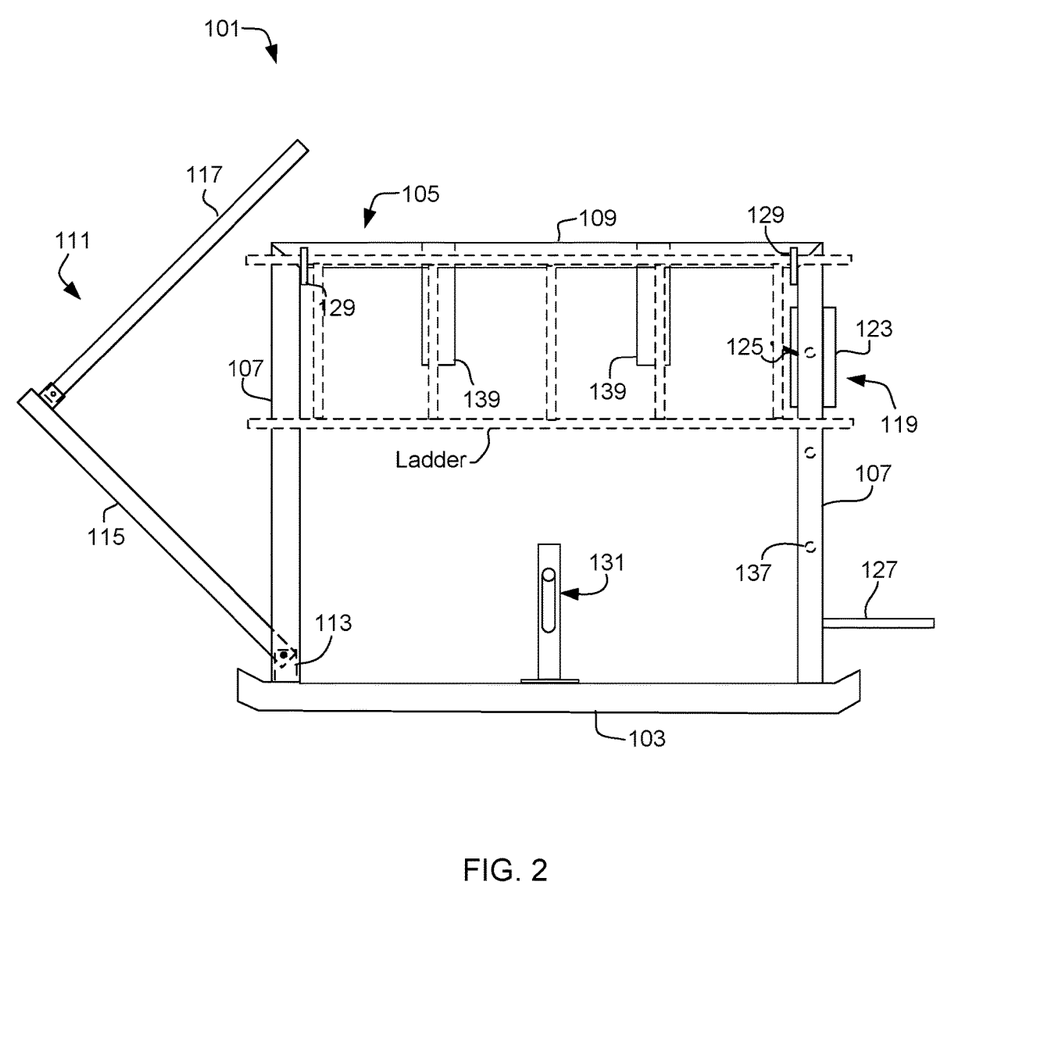
FIG. 2 is a right side view of the firefighter training device of FIG. 1.
Figure 3:
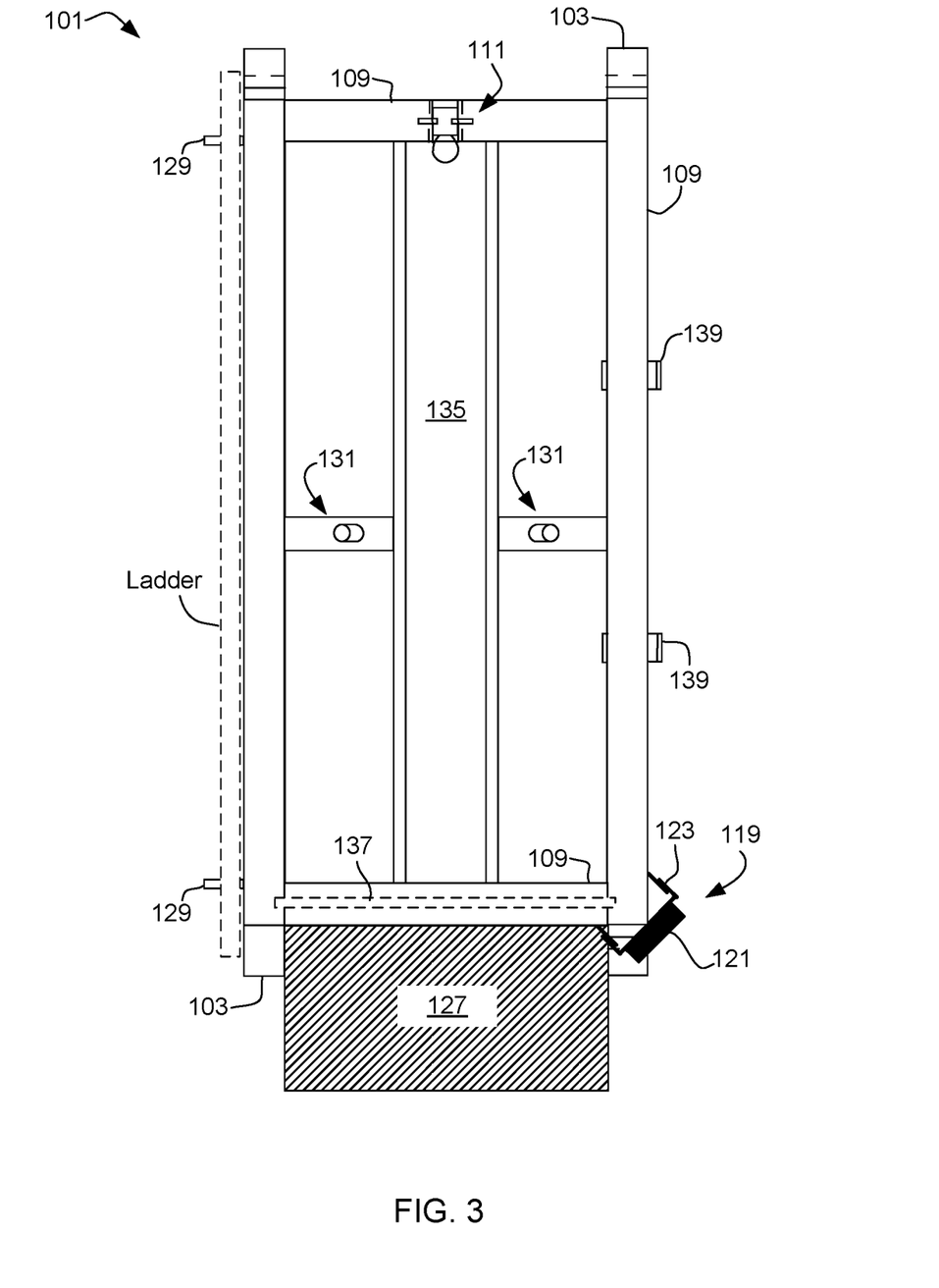
FIG. 3 is a top view of the firefighter training device of FIG. 1.

FIGS. 1 and 2 show opposing sides of device 101. Device 101 includes a sled 103 configured to slide upon the ground or other surface. A number of the simulation devices require the trainee to move device 101. Sled 103 includes tips that are angled upward away from the ground to prevent obstruction by ground textures and variations. It is understood that much of device 101 is constructed of rigidly formed materials and components, an example being metal. Other materials are considered, such as composites.

A frame 105 is coupled to sled 103 and is configured to support the plurality of simulation devices. Frame 105 forms are relatively rectangular structure over sled 103. Frame 105 is coupled to a top surface of sled 103. Frame 105 includes an upper portion and a lower portion, the lower portion being adjacent to the sled and the upper portion being opposite the lower portion. A series of vertical posts 107 define a perimeter of frame 105. Cross-members 109 span between the vertical posts 107 to finish the rectangular structure. Frame 105 is not limited to a rectangular shape but it has been found to best facilitate the functions of the device compared to other shapes. Frame 105 defines an interior as being the volume of space within the vertical posts 107 and between the cross-members 109 and sled 103.

Device 101 includes a plurality of simulation devices. In FIGS. 1-4, a ceiling breach simulation device 111 is illustrated. Device 111 is pivotally coupled to sled 103 via a mount 113. Device 111 includes a first pole 115 used to simulate a pike pole used to puncture and pull down ceilings. A second pole 117 is coupled to a second end of the first pole 115. The second end is opposite the first end where mount 113 is coupled. Second pole 117 is pivotally coupled to the second end such that the relative angle between poles 115 and 117 can vary. This helps the trainee to be able to maintain an approximately vertically oriented pole (i.e. pole 117) to better simulate operation of a pike pole.

Figure 4:
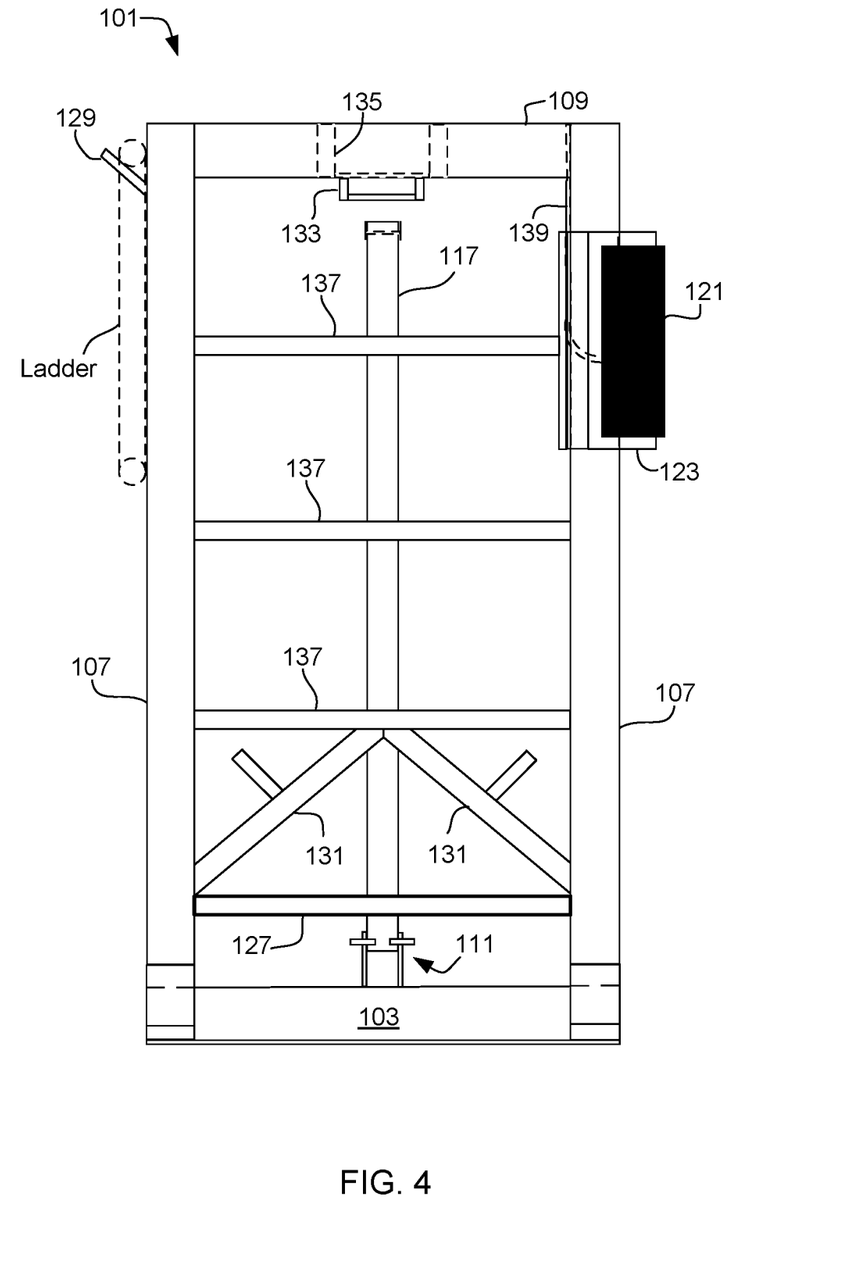
FIG. 4 is a front view of the firefighter training device of FIG. 1.

A feature of device 111 is that the point of coupling of device 111 to sled 103 is adjacent the ground. During operation, the trainee would have their hands on pole 117 above the pivoting point anchored to sled 103. This helps to keep the upper most portion of pole 117 free to move. This serves as a better simulation of using a pike pole. This configuration helps the trainee to experience any resistance to motion as a pulling force as opposed to a pushing force experienced at the upper tip portion of the pole. It is worth further noting that the multiple pivoting points along device 111 allow it to fold conveniently for storage between vertical posts 107 as seen in FIG. 4.

Device 101 further includes a door breach simulation device 119. Device 119 is coupled to an exterior portion of vertical post 107. Device 119 includes a mounted pad 121 coupled to a support 123. Pad 121 is releasably coupled to support 123 to permit interchanging and replacement. A tool attachment member 125 is also coupled to a portion of vertical post 107 behind device 119. Simulation of breaching a door is performed with a sledge hammer that is struck against pad 121. Member 125 is configured to secure the sledge hammer to the vertical post 107. It is understood that the height of device 119 is set at a common height at which a firefighter would strike a door. Pad 121 is sized to allow for variations in stature of different firefighters. It is also worth noting that device 119 is angled away from the defined flat sides of frame 105, such that pad 121 is closest to the edge of vertical post 107 and not the face of it. By angling pad 121 at the corner of vertical post 107, the trainee is more able to strike and swing the tool (sledge hammer) without fear of contacting their hands and the handle on the frame 105.

Device 101 further includes a stair simulation device 127 (i.e. a step). Device 127 is a platform elevated off the ground and configured to cantilever off sled 103. Device 127 extends away from frame 105. A trainee is able to repeatedly step up and down from device 127 to exercise their legs in preparation for climbing stairs. Device 127 is set off the ground at a proper and common height for stairs.

Device 101 further includes a rack 129 configured to include a plurality of extended members that extend away from frame 105 in a relative upward direction. Rack 129 is coupled to vertical posts 107 but may be configured to extend externally to any portion of frame 105. The individual components of rack 129 are ideally situated on a single side of frame 105, namely the longer side usually is best. A ladder is shown in dashed lines in FIGS. 2-4. It is not shown in FIG. 1 for the sake of clarity.

Device 101 further includes a weight support member 131 in communication with the sled 103. Member 131 is configured to provide a resting surface for accepting flat free weights. A post extends from an angularly oriented cross bar, such that the weight passes around the post. Member 131 is located on either or both sides of sled 103. Use of member 131 secures the weight within an interior of the frame 105 to help weight distribution to be equally applied to sled 103. A trainee may exchange, remove, or add weights to provide a comfortable and effective resistance to sliding along the ground. The interchangeability of the weights allows the trainee to adapt to different surfaces to which the sled 103 is exposed to during training.

Device 101 further includes a hose mount 133 and a tray 135 to assist in the simulation of pulling a firehose. Mount 133 is configured to couple to cross-member 109 at a central location. Mount 133 extends below member 109 in this configuration however that is not required. A training firehose is configured to attach to a portion of mount 133. When not in use, the firehose is wrapped around member 109 and neatly arranged within tray 135. Tray extends between members 109 on opposing ends of frame 105. The depth and length of tray 135 can be selected based upon the desired length of the firehose. It is understood that tray 135 is not required to have any particular shape or have to extend between members 109. It is important that tray 135 provide an elevated surface for the storage of the firehose. It is ideally suited to be coupled to any portion of frame 105. By locating tray 135 at an upper portion of frame 105, the firehose is prevented from swinging if it hanged down on a lower position as mount 133 is located also at an upper portion of frame 105.

In use, the firehose is removed from tray 135 and extended away from device 101 for pulling by the trainee. Device 101 may further include at least one hose rung 137 in communication with frame 105. Rungs 137 are located adjacent to mount 133 on frame 105. In the depicted embodiment, rungs 137 are located beneath mount 133. Rungs 137 are configured to redirect the pulling forces felt by the trainee to a more comfortable angle. As a trainee pulls on the firehose, the weight of the sled pulls back on the trainee. As different firefighters have different sized statures, it is important to provide a trainee the ability to adjust the angle at which the firehose is pulling on device 101. This is done by removing the firehose from tray 135 and wrapping a portion around one of the rungs 137. A plurality of rungs 137 are shown at varying heights above the ground.

Device 101 further includes a hook member 139 in communication with an upper portion of frame 105. The hook member 139 is configured to elevate portable hand held weights. The hand held weights are useful in simulating carrying heavy tools often used by firefighters. The weights may be kettlebells or other hand weights. Where member 139 is used for hand weights, member 131 is more suited for weights used on a bar. Members 139 are coupled to member 109 of frame 105 and extend downward and form a curved contact portion (shape of a "J") for the weight to fit in. Any number of members 139 may be used. It is best to use at least two to permit the user to at least carry a weight in each hand, in an effort to stay balanced during training. It is understood that a single member 139 may be used to carry multiple weights.

During training, the trainee can select from any of the above simulation devices or components. Device 101 is configured to be portable and carried easily via a trailer or vehicle. A trainee only needs to locate device 101 and select the simulation to perform. The trainee may use device 111 and pivot pole 117 and or 115 about mount 113 to simulate a pike pole. Additionally, the trainee may route a firehose through the hose rungs after selecting a comfortable height and simulate pulling a firehose. A trainee may swing a tool (sledge hammer) at pad 121 to simulate breaching a door. The weight of the sled may be adjusted by using members 131 to carry and adjust weight. The trainee may simulate tool carrying by using members 139 and its associated hand weights. It should be known that a trainee may attach one or more straps to vertical posts 107 or other locations on device 101 to simulate carrying a victim. Ideally this would necessitate a low anchor point to frame 105 or sled 103.

Figure 5:
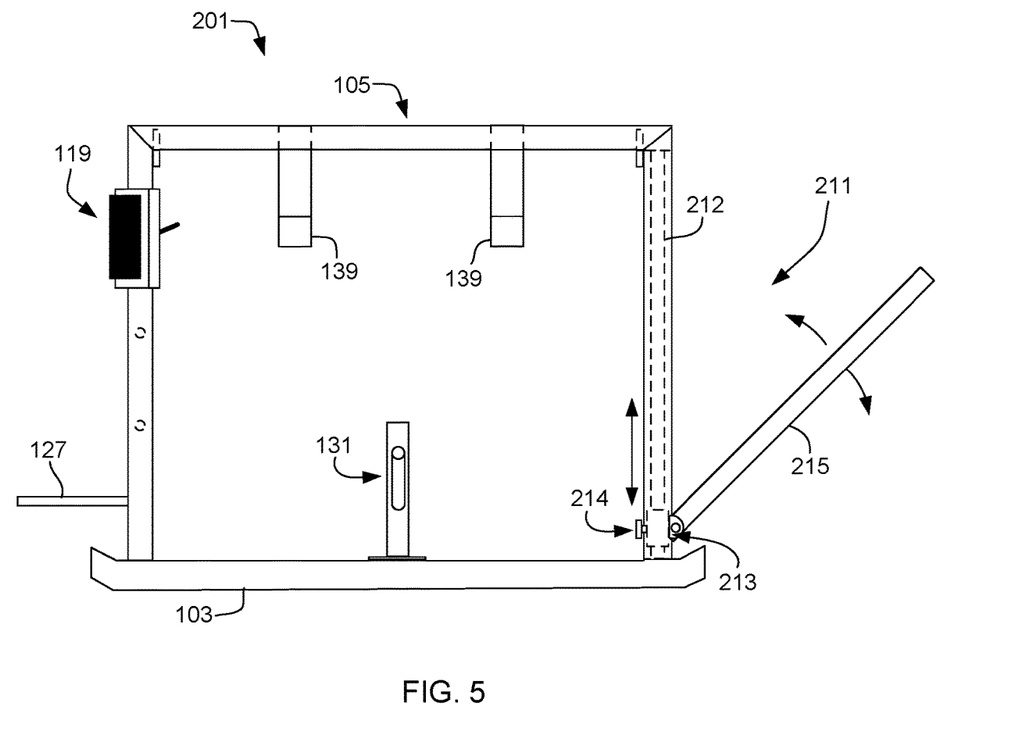
FIG. 5 is a side view of an alternate embodiment of the firefighter training device of FIG. 1.
Figure 6:
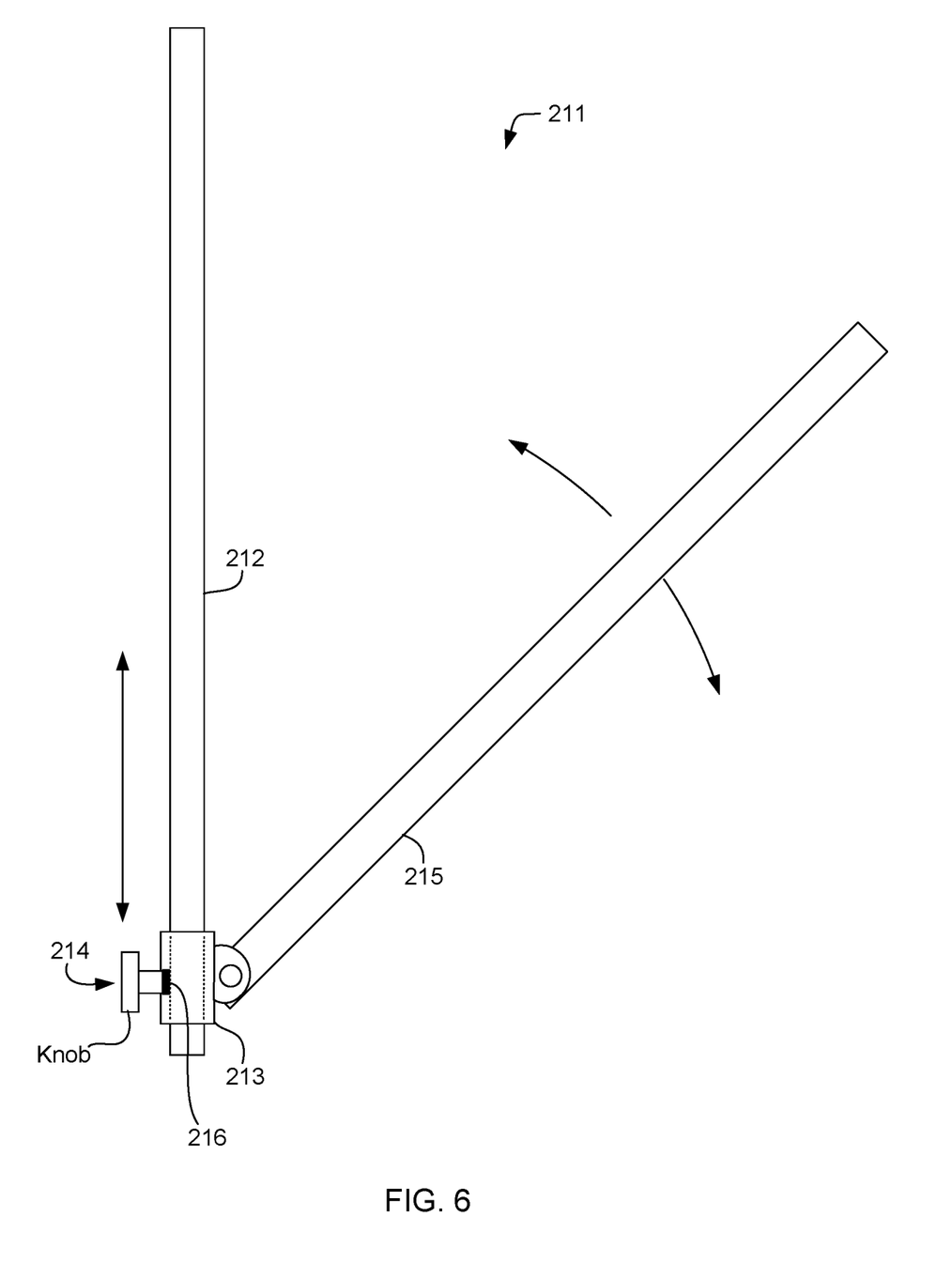
FIG. 6 is an enlarged side view of a ceiling breach simulation device used in the firefighter training device of FIG. 5.

Referring now also to FIGS. 5 and 6 in the drawings, a side view of an alternative embodiment of device 101 is illustrated. FIG. 6 provides an enlarged partial view of a portion of device 201. Firefighting training device 201 is similar in form and function to that of device 101. Same components and numerical identifiers are shared among the embodiments. Variations between the two are seen in particular with the ceiling breach simulation device. Ceiling breach simulation device 211 is similar to that of device 111. Device 211 includes at least one pole 215 that operates similarly to that of pole 115. Pole 215 is pivotally coupled to a mount 213. A difference is seen in that mount 213 is coupled to a track 212 which extends relatively vertically between sled 103 and frame 105. FIG. 6 shows device 211 in more clarity. As pole 215 is operated, mount 213 translates along track 212. In this embodiment, device 211 is configured to maintain the benefits of a lower mounted pivoting mount but also facilitate an additionally natural feel in permitting both a rotational movement and a vertical movement of pole 215. Device 111 permits only the rotational movement of pole 115. Mount 213 is configured to include a tensioning member 214 configured to vary the amount of resistance to motion between mount 213 and track 212. In this embodiment a knob may be rotated which will threadedly communicate with mount 213. An internal pad 216 selectively contacts track 212 as the knob is threaded into or out of mount 213. It is understood that other methods of varying the resistance of movement between mount 213 and track 212 are conceivable. Device 211 is not herein limited to only this type of tensioning method.

The current application has many advantages over the prior art including at least the following: (1) portable singular training device for simulating various fireground activities of a firefighter; (2) ability to adjust the operation of the simulation devices to the size of the trainee; (3) ability to adjust the resistance of the simulation devices and methods to the capability of the trainee; and (4) the location of the pivoting point of the ceiling breach simulation device being below the contact point of the trainee on the pole.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A firefighter training device, comprising:
   a sled having a plurality of runners;
   a frame in communication with the sled; and
   a ceiling breach simulation device in communication with the sled, the ceiling breach simulation device configured to include a pole having a first end and a second end, the pole configured to pivot about a mount in communication with the sled, the pivot point of the pole being at the first end of the pole, the ceiling breach simulation device includes a track extending between the sled and the frame, the mount configured to selectively translate along the track when used, the pole configured to pivot relative to the mount, the mount is configured to include a tensioning member to vary the amount of resistance to motion between the mount and the track.

2. The device of claim 1, wherein movement of the pole is restricted at the sled.

3. The device of claim 1, wherein the ceiling breach simulation device includes a second pole, the second pole coupled at the second end of the pole.

4. The device of claim 1, further comprising:
   a stair simulation device in communication with the sled, the stair simulation device configured to extend away from the frame beyond the sled.

5. The device of claim 1, further comprising:
   a rack in communication with an upper portion of the frame, the rack configured to extend externally to the frame.

6. The device of claim 1, further comprising:
   a weight support member in communication with the sled, the weight support member configured to secure an amount of weight within an interior of the frame.

7. The device of claim 1, further comprising:
   a door breach simulation device in communication with the frame, the door breach simulation device configured to include a support coupled to an exterior of the frame and locate a pad.

8. The device of claim 1, further comprising:
   a hose mount in communication with an upper portion of the frame, the hose mount configured to secure a portion of firehose to the frame.

9. The device of claim 8, further comprising:
   a tray in communication with the upper portion of the frame so as to extend between opposing ends of the frame, the tray configured to support the firehose in a resting condition.

10. The device of claim 8, further comprising:
    at least one hose rung in communication with the frame below the hose mount, the at least one hose rung is configured to redirect the forces on a user when pulling the firehose, the firehose wrapping partially around the at least one hose rung.

11. The device of claim 1, further comprising:
    a hook member in communication with an upper portion of the frame, the hook member configured to elevate a fitness weight above the sled.

12. A method of performing fireground training exercises, comprising:
    obtaining a firefighter training device having:
      a sled having a plurality of runners;
      a frame in communication with the sled; and
      a ceiling breach simulation device in communication with the sled, the ceiling breach simulation device configured to include a pole having a first end and a second end, the pole configured to pivot about a mount in communication with the sled, the pivot point of the pole being at the first end of the pole; and
      pivoting the pole about the mount;
    operating the ceiling breach simulation device within a track extending between the sled and the frame, the mount configured to selectively translate along the track when used, the pole configured to pivot relative to the mount, the mount is configured to include a tensioning member to vary the amount of resistance to motion between the mount and the track; and
    adjusting tension in the mount to vary resistance to motion between the mount and the track.

13. The method of claim 12, further comprising:
    routing a firehose through a hose rung in accordance with the height of the user, the hose rung configured to facilitate a proper positioning of the hose upon pulling.

14. The method of claim 12, further comprising:
    swinging a tool at a door breach simulation device in communication with an exterior of the frame.

15. The method of claim 12, further comprising:
    pulling the sled and frame along a surface.

16. The method of claim 15, further comprising:
    adjusting the weight of the sled by adding or decreasing weights located on a weight support member in communication with the frame.

17. The method of claim 12, wherein pivoting the pole about the mount changes the location of the mount in relation to the sled.

\* \* \* \* \*